United States Patent
Kobayashi

(10) Patent No.: US 12,379,129 B2
(45) Date of Patent: Aug. 5, 2025

(54) AIR CONDITIONING SYSTEM AND CONTROL UNIT

(71) Applicant: Panasonic Intellectual Property Management Co., Ltd., Osaka (JP)

(72) Inventor: Kazuyuki Kobayashi, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 827 days.

(21) Appl. No.: 17/423,191

(22) PCT Filed: Jan. 30, 2020

(86) PCT No.: PCT/JP2020/003376
§ 371 (c)(1),
(2) Date: Jul. 15, 2021

(87) PCT Pub. No.: WO2020/162306
PCT Pub. Date: Aug. 13, 2020

(65) Prior Publication Data
US 2022/0065488 A1    Mar. 3, 2022

(30) Foreign Application Priority Data
Feb. 6, 2019   (JP) .................................. 2019-019336

(51) Int. Cl.
*F24F 11/77* (2018.01)
*F24F 1/0035* (2019.01)
(Continued)

(52) U.S. Cl.
CPC .............. *F24F 11/77* (2018.01); *F24F 11/80* (2018.01); *F24F 1/0035* (2019.02); *F24F 2110/64* (2018.01); *F24F 2110/70* (2018.01)

(58) Field of Classification Search
CPC .. F24F 11/77; F24F 11/80; F24F 11/64; F24F 2110/10; F24F 2110/12; F24F 1/0035; F24F 7/007; F24F 11/74
(Continued)

(56) References Cited

U.S. PATENT DOCUMENTS

| 4,478,049 | A | * | 10/1984 | Fukui | ..................... B60H 1/008 454/75 |
| 6,415,617 | B1 | * | 7/2002 | Seem | ...................... F24F 11/30 62/271 |

(Continued)

FOREIGN PATENT DOCUMENTS

| BE | 1005936 | A6 | * | 3/1994 | ............ F24F 11/001 |
| JP | H08145432 | A | * | 6/1996 | |

(Continued)

OTHER PUBLICATIONS

International Search Report issued in Patent Application No. PCT/JP2020/003376 dated Apr. 14, 2020.

*Primary Examiner* — Edelmira Bosques
*Assistant Examiner* — Frances F. Hamilton
(74) *Attorney, Agent, or Firm* — MCDONALD HOPKINS LLC

(57) ABSTRACT

When an instruction to request increase in the amount of air supply of air supply fan (2) is generated, operating conditions of air conditioner (3) is determined based on outdoor temperature information acquired by outdoor temperature acquisition unit (24) and indoor temperature information acquired by indoor temperature acquisition unit (32). Then, air conditioner (3) is instructed on the determined operating conditions.

13 Claims, 2 Drawing Sheets

(51) Int. Cl.
*F24F 11/64* (2018.01)
*F24F 11/80* (2018.01)
*F24F 110/70* (2018.01)
*F24F 110/64* (2018.01)

(58) Field of Classification Search
USPC ............................................................ 454/239
See application file for complete search history.

(56) References Cited

U.S. PATENT DOCUMENTS

| | | | | |
|---|---|---|---|---|
| 6,684,944 | B1* | 2/2004 | Byrnes | F04D 27/00 236/78 D |
| 8,651,391 | B2* | 2/2014 | Patch | F24F 11/46 62/186 |
| 10,520,214 | B2* | 12/2019 | Motodani | F24F 11/72 |
| 2004/0253918 | A1* | 12/2004 | Ezell | F24F 11/63 454/239 |
| 2005/0087616 | A1* | 4/2005 | Attridge | F24F 11/30 165/254 |
| 2005/0224591 | A1* | 10/2005 | Wolfson | F24F 11/0001 236/49.3 |
| 2007/0111655 | A1* | 5/2007 | Song | F24F 11/52 454/292 |
| 2009/0236432 | A1* | 9/2009 | Malloy | F24F 11/77 700/282 |
| 2012/0052791 | A1* | 3/2012 | Kurelowech | F24F 11/64 454/329 |
| 2012/0072032 | A1* | 3/2012 | Powell | F24F 11/30 700/278 |
| 2012/0310420 | A1* | 12/2012 | Quirk | F24F 11/76 700/278 |
| 2013/0095745 | A1* | 4/2013 | Davledzarov | F24F 11/70 454/333 |
| 2015/0013958 | A1* | 1/2015 | Kubo | F24F 11/46 165/250 |
| 2015/0176909 | A1* | 6/2015 | Josserand | F24F 7/10 165/121 |
| 2016/0018123 | A1* | 1/2016 | Yabunouchi | F24F 11/64 700/278 |
| 2017/0010008 | A1* | 1/2017 | Taoka | F24F 11/30 |
| 2017/0307243 | A1* | 10/2017 | Burt | F24F 11/46 |
| 2018/0128511 | A1 | 5/2018 | Motodani et al. | |
| 2018/0195752 | A1* | 7/2018 | Sasaki | F24F 11/64 |
| 2020/0080742 | A1* | 3/2020 | Okamoto | G05B 17/02 |
| 2020/0208867 | A1* | 7/2020 | Emoto | F24F 11/0008 |
| 2020/0326088 | A1* | 10/2020 | Mowris | G05B 19/042 |
| 2021/0293439 | A1* | 9/2021 | Melink | F24F 11/46 |
| 2021/0356159 | A1* | 11/2021 | Tamaki | F24F 11/46 |
| 2022/0042702 | A1* | 2/2022 | Okamoto | F24F 11/65 |

FOREIGN PATENT DOCUMENTS

| | | | |
|---|---|---|---|
| JP | 2001-272086 A | 10/2001 | |
| JP | 2006-200818 A | 8/2006 | |
| JP | 2007-071495 A | 3/2007 | |
| JP | 2008-185330 A | 8/2008 | |
| JP | 4346295 B2 * | 10/2009 | |
| JP | 2011-021881 A | 2/2011 | |
| JP | 2018-173264 A | 11/2018 | |
| KR | 20130118472 A * | 10/2013 | |
| WO | 2015/107598 A1 | 7/2015 | |
| WO | WO-2016071951 A1 * | 5/2016 | ............ F24F 11/89 |
| WO | 2017/002245 A1 | 1/2017 | |

* cited by examiner

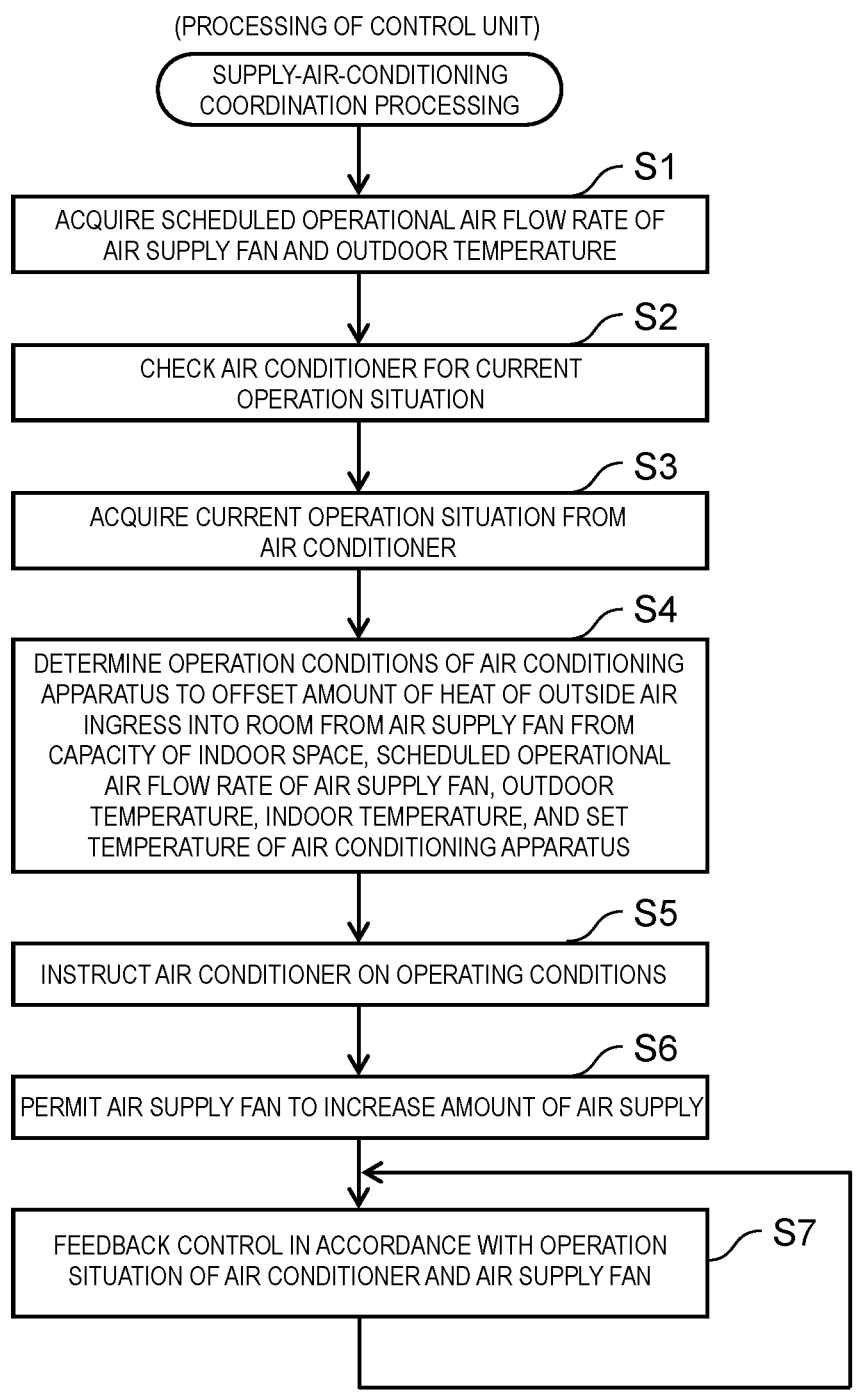

AIR CONDITIONING SYSTEM AND CONTROL UNIT

TECHNICAL FIELD

The present invention relates to an air conditioning system and a control unit.

BACKGROUND ART

An air conditioning system constructed in one indoor space has been conventionally known. The air conditioning system includes an air supply fan that supplies outside air to an indoor space, an air conditioner that performs air conditioning of the indoor space, and a control device that controls the air supply fan and the air conditioner (e.g., PTL 1).

CITATION LIST

Patent Literature

PTL 1: International Publication No. WO 2015/107598

SUMMARY OF THE INVENTION

The air conditioning system described in PTL 1 is configured such that in summer, for example, increase in the amount of air supply of the air supply fan causes a larger amount of outside air at high temperature to be supplied to the indoor space cooled by the air conditioner. This causes temperature of indoor air to temporarily increase until the indoor air is cooled again by the air conditioner. Conversely, in winter, increase in the amount of air supply of the air supply fan causes the temperature of the indoor air to temporarily decrease. As described above, the conventional air conditioning system has a problem in that increase in the amount of air supply of the air supply fan may cause a person in the indoor space to be uncomfortable.

The present invention is made to solve the above problem, and an object of the present invention is to provide an air conditioning system and a control unit that are capable of reducing a temperature change in an indoor space when the amount of air supply of an air supply fan increases.

To achieve this object, an air conditioning system of the present invention includes an air supply fan that supplies outside air to an indoor space, an air conditioner that performs air conditioning of the indoor space, an outdoor temperature acquisition unit that acquires information on temperature of the outside air, an indoor temperature acquisition unit that acquires information on temperature of the indoor space, and a control unit that controls operation of the air supply fan and the air conditioner. The control unit includes a determiner that determines operating conditions of the air conditioner based on the information on the temperature of outside air acquired by the outdoor temperature acquisition unit and the information on the temperature of the indoor space acquired by the indoor temperature acquisition unit when an instruction to request an increase in an amount of air supply of the air supply fan is generated, and an air conditioning instruction unit that instructs the air conditioner on the operating conditions determined by the determiner.

The control unit of the present invention controls operation of the air supply fan that supplies outside air to an indoor space and the air conditioner that performs air conditioning of the indoor space, and includes the determiner that determines operating conditions of the air conditioner based on information on temperature of the outside air and information on temperature of the indoor space when an instruction to request increase in an amount of air supply of the air supply fan is generated, and the air conditioning instruction unit that instructs the air conditioner on the operating conditions determined by the determiner.

According to the air conditioning system and the control unit of the present invention, when an instruction to request increase in the amount of air supply of the air supply fan is generated, the determiner determines operating conditions of the air conditioner based on information on temperature of outside air, acquired by the outdoor temperature acquisition unit, and information on temperature of the indoor space acquired by the indoor temperature acquisition unit. Then, the instruction unit instructs the air conditioner on the operating conditions determined by the determiner. This produces an effect of reducing a temperature change in the indoor space when the amount of air supply of the air supply fan increases.

BRIEF DESCRIPTION OF DRAWINGS

FIG. 2 is a flowchart illustrating supply-air-conditioning coordination processing performed by the control unit.

DESCRIPTION OF EMBODIMENT

Figure 1:
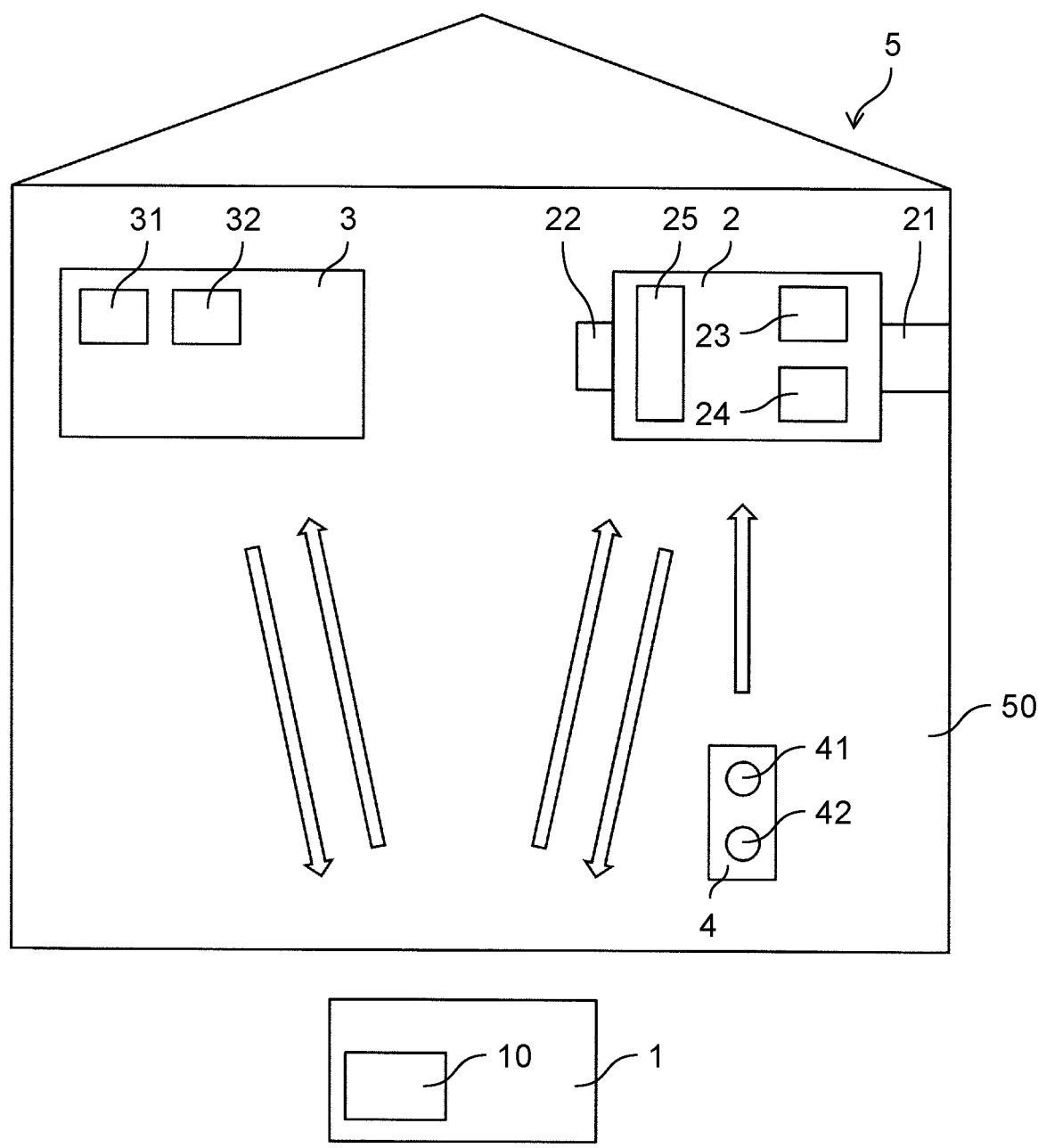
FIG. 1 is a schematic diagram illustrating a schematic configuration of an air conditioning system and a control unit according to an exemplary embodiment of the present invention.

Hereinafter, an exemplary embodiment of the present invention will be described with reference to the accompanying drawings. The following exemplary embodiment illustrates a preferable specific example of the present invention. Thus, numerical values, shapes, materials, components, placement positions and connection forms of the components, etc., which are described in the following exemplary embodiment, are illustrative and are not to limit the scope of the present invention. The following exemplary embodiment includes components in which a component, which is not described in the independent claim showing the highest concept of the present invention, is described as an optional component. In each drawing, substantially the same components are denoted by the same reference numerals to eliminate or simplify duplicated description.

First, a schematic configuration of air conditioning system 5 and control unit (control device) 1 according to the exemplary embodiment of the present invention will be described with reference to FIG. 1. FIG. 1 is a schematic diagram illustrating the schematic configuration of air conditioning system 5 and control unit 1.

Air conditioning system 5 is constructed for indoor space 50 in one room. Air conditioning system 5 includes air supply fan 2, air conditioner 3, indoor sensor unit 4, and control unit 1.

Air supply fan 2 supplies outside air to indoor space 50. Air supply fan 2 is provided, for example, between an outdoor space and indoor space 50. Air supply fan 2 includes a housing having suction port 21 and blow-out port 22. Air conditioning system 5 is provided in the housing of air supply fan 2 with air supply fan communication controller 23, outdoor temperature acquisition unit 24, and cleaning filter 25. Air supply fan 2 sucks outside air through suction port 21, removes dust with cleaning filter 25, and supplies the sucked outside air to indoor space 50 through blow-out port 22.

Air supply fan communication controller 23 controls wireless communication or wired communication performed between indoor sensor unit 4 and control unit 1.

Outdoor temperature acquisition unit 24 includes a temperature sensor that detects temperature of outside air (or temperature in an outdoor space), and acquires information on temperature of outside air by detecting the temperature of the outside air sucked through suction port 21 with the temperature sensor. Outdoor temperature acquisition unit 24 is an element constituting air conditioning system 5.

Outdoor temperature acquisition unit 24 may be provided outside air supply fan 2, and can be provided at any place as long as temperature of outside air can be acquired. For example, outdoor temperature acquisition unit 24 may be attached to an outer wall of a house.

Air conditioner 3 performs air conditioning of indoor space 50 based on specified operating conditions, and performs cooling or heating such that temperature in indoor space 50 reaches a target temperature. Air conditioner 3 is configured to be operable with cooling capacity or heating capacity within a predetermined range, and the cooling capacity or the heating capacity in air-conditioning operation is set based on a difference between a target temperature and a current temperature in indoor space 50.

Air conditioner 3 includes air conditioner communication controller 31 and indoor temperature acquisition unit 32. Air conditioner communication controller 31 controls wireless communication or wired communication performed with control unit 1.

Indoor temperature acquisition unit 32 includes a temperature sensor that detects temperature in indoor space 50, and acquires information on temperature in indoor space 50 by detecting the temperature in indoor space 50 with the temperature sensor. Indoor temperature acquisition unit 32 is an element constituting air conditioning system 5.

Indoor temperature acquisition unit 32 may be provided outside air conditioner 3, and can be provided at any place as long as temperature in indoor space 50 can be acquired. For example, indoor temperature acquisition unit 32 may be attached to a wall of a room in which indoor space 50 is constructed, or may be provided in indoor sensor unit 4.

Indoor sensor unit 4 includes a plurality of sensors for detecting various states in indoor space 50. Indoor sensor unit 4 includes, for example, carbon dioxide concentration detector 41 and particulate detector 42.

Carbon dioxide concentration detector 41 detects concentration of carbon dioxide in indoor space 50. Particulate detector 42 detects a concentration of particulates in indoor space 50.

Indoor sensor unit 4 further includes a controller (not illustrated). The controller monitors the concentration of carbon dioxide in indoor space 50 detected by carbon dioxide concentration detector 41 or the concentration of particulates in indoor space 50 detected by particulate detector 42. The controller determines whether the concentration of carbon dioxide exceeds a first threshold value, or determines whether the concentration of particulates exceeds a second threshold value. The controller generates an air-supply increase instruction for requesting an increase in the amount of air supply of air supply fan 2, based on the determination described above. Indoor sensor unit 4 transmits the air-supply increase instruction to air supply fan 2. The air-supply increase instruction may be generated based on user's operation. For example, air conditioning system 5 may include a remote controller that receives an instruction to increase the amount of air supply from a user. The remote controller may generate an air-supply increase instruction based on an instruction from the user and transmit the air-supply increase instruction to air supply fan 2.

Control unit 1 controls operation of air supply fan 2 and air conditioner 3. Control unit 1 includes control unit communication controller 10 that controls wireless communication or wired communication performed between air supply fan 2 and air conditioner 3. That is, control unit 1 is communicably connected to air supply fan 2 and air conditioner 3.

Next, operation of air conditioning system 5 and control unit 1 will be described with reference to FIGS. 1 and 2. FIG. 2 is a flowchart illustrating supply-air-conditioning coordination processing performed by control unit 1.

As described above, indoor sensor unit 4 generates the air-supply increase instruction when determining that the concentration of carbon dioxide in indoor space 50 exceeds the first threshold value or when determining that the concentration of particulates in indoor space 50 exceeds the second threshold value. Indoor sensor unit 4 transmits the air-supply increase instruction to air supply fan 2. Air supply fan 2 receives the air-supply increase instruction from indoor sensor unit 4 using air supply fan communication controller 23. When receiving the air-supply increase instruction, air supply fan 2 determines a scheduled operational air flow rate being an increased amount of air supply.

Air supply fan 2 may autonomously generate the air-supply increase instruction. For example, when the concentration of carbon dioxide in indoor space 50 increases, indoor sensor unit 4 may transmit information indicating the concentration of carbon dioxide to air supply fan 2. Alternatively, when the concentration of particulates in indoor space 50 increases, indoor sensor unit 4 may transmit information indicating the concentration of particulates to air supply fan 2. Alternatively, indoor sensor unit 4 may transmit information indicating the concentration of carbon dioxide in indoor space 50 and the concentration of particulates in indoor space 50 to air supply fan 2 every predetermined time. Then, air supply fan 2 may determine whether the concentration of carbon dioxide in indoor space 50 exceeds the first threshold value or whether the concentration of particulates in indoor space 50 exceeds the second threshold value. Air supply fan 2 may generate the air-supply increase instruction based on the determination described above.

Control unit 1 may generate the air-supply increase instruction. For example, when determining an increase in the concentration of carbon dioxide in indoor space 50 detected by carbon dioxide concentration detector 41 or an increase in the concentration of particulates in indoor space 50 detected by particulate detector 42, indoor sensor unit 4 may transmit information indicating that the concentration of carbon dioxide or the concentration of particulates has increased to control unit 1. When receiving the information indicating that the concentration of carbon dioxide or the concentration of particulates has increased from indoor sensor unit 4, control unit 1 may generate an air-supply increase instruction and output the air-supply increase instruction to air supply fan 2.

When the concentration of carbon dioxide in indoor space 50 increases, indoor sensor unit 4 may transmit information indicating the concentration of carbon dioxide to control unit 1. Alternatively, when the concentration of particulates in indoor space 50 increases, indoor sensor unit 4 may transmit information indicating the concentration of particulates to control unit 1. Alternatively, indoor sensor unit 4 may transmit information indicating the concentration of carbon dioxide in indoor space 50 and the concentration of particulates in indoor space 50 to control unit 1 every predetermined time. Then, control unit 1 may determine whether the concentration of carbon dioxide in indoor space 50 exceeds the first threshold value or whether the concentration of particulates in indoor space 50 exceeds the second threshold value. Control unit 1 may generate an air-supply increase instruction based on the determination described above and output the air-supply increase instruction to air supply fan 2.

Air supply fan 2 receives the air-supply increase instruction and determines the scheduled operational air flow rate. Air supply fan 2 transmits not only instruction reception information indicating that the air-supply increase instruction is received, but also air flow rate information indicating the determined scheduled operational air flow rate, and information on temperature of outside air, acquired by outdoor temperature acquisition unit 24, to control unit 1 using air supply fan communication controller 23.

Control unit 1 receives the instruction reception information using control unit communication controller 10. Control unit 1 can recognize generation of the air-supply increase instruction from the instruction reception information. When receiving the instruction reception information, control unit 1 performs the supply-air-conditioning coordination processing illustrated in FIG. 2.

When the supply-air-conditioning coordination processing is performed, control unit 1 first acquires the air flow rate information and the information on temperature of outside air that are transmitted from air supply fan 2 together with the instruction reception information (S1). Next, control unit 1 transmits an instruction to check a current operation status to air conditioner 3 using control unit communication controller 10 (S2).

When receiving the instruction for checking a current operation status from control unit 1 using air conditioner communication controller 31, air conditioner 3 transmits the current operation status of air conditioner 3 to control unit 1. Here, examples of the current operation status include a target temperature in indoor space 50 set in air conditioner 3, and information on a current temperature in indoor space 50 acquired by indoor temperature acquisition unit 32. As the current operation status of air conditioner 3, cooling capacity or heating capacity that is currently set in air conditioner 3, a blast volume that is currently set in air conditioner 3, or the like may be transmitted.

After processing in S2 of the supply-air-conditioning coordination processing, control unit 1 acquires a current operation status from air conditioner 3 using control unit communication controller 10 (S3). The current operation status of air conditioner 3 includes the information on a current temperature in indoor space 50. Then, control unit 1 determines operating conditions of air conditioner 3 based on at least the information on a temperature of outside air acquired in processing in S1 and the information on a temperature in indoor space 50 acquired in processing in S3 (S4).

For example, in processing in S4, the amount of heat of outside air to be supplied to indoor space 50 is predicted from capacity of indoor space 50 preset in control unit 1, the scheduled operational air flow rate of air supply fan 2 acquired from air supply fan 2, and a temperature of the outside air. Then, based on the current temperature in indoor space 50 acquired by air conditioner 3 and the target temperature in indoor space 50 set in air conditioner 3, control unit 1 determines the operating conditions of air conditioner 3 such that the previously determined amount of heat of the outside air to be supplied to indoor space 50 is offset to cause indoor space 50 to have the target temperature. Control unit 1 that performs the processing in S4 corresponds to the determiner of the present invention.

Examples of the operating conditions of air conditioner 3 determined in the processing in S4 include the target temperature set in air conditioner 3. When temperature in indoor space 50 rises due to supply of outside air, temperature rise in indoor space 50 due to the supply of outside air can be reduced by lowering the target temperature of air conditioner 3 based on a degree of the rise in temperature. In contrast, when temperature in indoor space 50 decreases due to supply of outside air, temperature decrease in indoor space 50 due to the supply of outside air can be reduced by increasing the target temperature of air conditioner 3 based on a degree of the decrease in temperature.

The operating conditions of air conditioner 3 determined in the processing in S4 may be cooling capacity or heating capacity set in air conditioner 3. When temperature in indoor space 50 rises due to supply of outside air, temperature rise in indoor space 50 due to the supply of outside air can be reduced by increasing the cooling capacity of air conditioner 3 based on a degree of the rise in temperature. In contrast, when temperature in indoor space 50 decreases due to supply of outside air, temperature decrease in indoor space 50 due to the supply of outside air can be reduced by increasing the heating capacity of air conditioner 3 based on a degree of the decrease in temperature. The operating conditions of air conditioner 3 determined in the processing in S4 may be the blast volume set in air conditioner 3.

As described above, air conditioning system 5 can reduce temperature change in indoor space 50 even when a large amount of outside air is supplied to indoor space 50 as the amount of air supply of air supply fan 2 increases.

When the operating conditions of air conditioner 3 is determined in the processing in S4, control unit 1 instructs air conditioner 3 on the determined operating conditions using control unit communication controller 10 (S5). When receiving the instructed operating conditions using air conditioner communication controller 31, air conditioner 3 starts operating in accordance with the instructed operating conditions. Control unit 1 that performs processing in S5 corresponds to the air conditioning instruction unit of the present invention.

Here, even when air conditioner 3 starts operation in accordance with instructed operating conditions, it takes time until desired operation is performed under the operating conditions (e.g., until air having a desired temperature is blown out). Thus, control unit 1 performs processing in S6 after air conditioner 3 is instructed on the operating conditions in the processing in S5 and a predetermined period of time elapses. That is, control unit 1 permits air supply fan 2 to increase the amount of air supply using control unit communication controller 10 (S6). Air supply fan 2 increases the amount of air supply by receiving permission to increase the amount of air supply from control unit 1 using air supply fan communication controller 23. Air supply fan 2 maintains the amount of air supply without change from when an instruction to request increase in the amount of air supply of air supply fan 2 is generated to when an instruction to permit increase in the amount of air supply of air supply fan 2 is received.

This allows air supply fan 2 to increase the amount of air supply when air conditioner 3 starts desired operation or when air conditioner 3 is about to start the desired operation. Thus, even when air supply fan 2 increases supply of outside air, air conditioner 3 can reliably reduce temperature change in indoor space 50. Control unit 1 that performs the processing in S6 corresponds to an air supply instruction unit of the present invention.

The predetermined period of time from when air conditioner 3 is instructed on the operation conditions in the processing in S5 to when the processing in S6 is performed may be calculated based on the amount of heat of the outside air supplied by air supply fan 2 and a target temperature of air conditioner 3. For example, when it is determined that air conditioner 3 needs large energy to maintain the target temperature in indoor space 50 due to the amount of heat of outside air to be supplied, the predetermined period of time may be extended. When it is determined that air conditioner 3 needs small energy to maintain the target temperature in indoor space 50 due to the amount of heat of outside air to be supplied, the predetermined period of time may be shortened.

When permitting increase in the amount of air supply, control unit 1 may immediately cause air supply fan 2 to operate with the scheduled operational air flow rate, or may cause air supply fan 2 to increase the amount of air supply stepwise to gradually reach the scheduled operational air flow rate. The stepwise increase in the amount of air supply enables reducing temperature change in indoor space 50 while air in indoor space 50 is cleaned without waiting until operation of air conditioner 3 is stabilized.

After the processing in S6, control unit 1 performs processing in S7 to perform feedback control for controlling operation of air conditioner 3 and air supply fan 2 in accordance with operation statuses of air conditioner 3 and air supply fan 2, respectively.

For example, air supply fan 2 monitors the concentration of carbon dioxide in indoor space 50 detected by carbon dioxide concentration detector 41 of indoor sensor unit 4 or the concentration of particulates in indoor space 50 detected by particulate detector 42. When air supply fan 2 determines that increase in the amount of air supply of air supply fan 2 causes the concentration of carbon dioxide or the concentration of particulates to decrease to lower than that at the start of the increase in the amount of air supply, air supply fan 2 reduces the amount of air supply. In this case, air supply fan 2 transmits information indicating that the amount of air supply is reduced to control unit 1. Control unit 1 calculates the amount of heat from outside air that decreases due to the reduction in the amount of air supply, and controls air conditioner 3 based on the calculated amount of heat.

In contrast, when a detection result of indoor sensor unit 4 causes air supply fan 2 to determine that the concentration of carbon dioxide or the concentration of particulates in indoor space 50 further deteriorates from the start of the increase in the amount of air supply, air supply fan 2 further increases the amount of air supply. In this case, air supply fan 2 transmits information indicating that the amount of air supply is further increased to control unit 1. Control unit 1 having received the information from air supply fan 2 controls air conditioner 3 in accordance with change in the amount of heat of the outside air supplied by air supply fan 2.

As described above, according to air conditioning system 5 and control unit 1 of the present exemplary embodiment, when an instruction to request increase in the amount of air supply of air supply fan 2 is generated, operating conditions of air conditioner 3 is determined based on information on temperature of outside air acquired by outdoor temperature acquisition unit 24 and information on temperature of the indoor space acquired by indoor temperature acquisition unit 32. Then, air conditioner 3 is instructed on the determined operating conditions. This enables reducing a temperature change in indoor space 50 when the amount of air supply of air supply fan 2 increases.

Although the present invention is described above based on the exemplary embodiment, the present invention is not limited to the above exemplary embodiment at all, and it can be easily inferred that various modifications and variations can be made without departing from the gist of the present invention. For example, the numerical values mentioned in the above exemplary embodiment are merely examples, and other numerical values can be naturally used.

Air conditioning system 5 according to the above exemplary embodiment is constructed for indoor space 50 in one room. Air conditioning system 5 may be constructed in a highly heat-insulated and highly airtight house including a plurality of rooms and at least one air conditioning room connected to each room with an air supply duct. Air conditioning system 5 controls air conditioning in the air conditioning room. Air in the air conditioning room is individually distributed using a controller disposed in each room.

Control unit 1 may be provided outside a house, e.g., in a cloud server operated by a management company that manages control of air conditioning system 5, control unit 1 being capable of communicating with air conditioner 3 and the like. In such a case, control unit 1 is mainly implemented by a combination of a central processing unit (CPU) of the cloud server and software executed on the CPU.

INDUSTRIAL APPLICABILITY

The air conditioning system according to the present invention can be applied to an air conditioning system that introduces outside air into an indoor space using an air supply fan and performs air conditioning in the indoor space using an air conditioner.

REFERENCE MARKS IN THE DRAWINGS 1 control unit
2 air supply fan
3 air conditioner
4 indoor sensor unit
5 air conditioning system
10 control unit communication controller
21 suction port
22 blow-out port
23 air supply fan communication controller
24 outdoor temperature acquisition unit
25 cleaning filter
31 air conditioner communication controller
32 indoor temperature acquisition unit
41 carbon dioxide concentration detector
42 particulate detector
50 indoor space

What is claimed is:
1. An air conditioning system comprising:
an air supply fan that supplies outside air to an indoor space;
an air conditioner that performs air conditioning of the indoor space;
an outdoor temperature sensor that acquires information on a temperature of the outside air;
an indoor temperature sensor that acquires information on a temperature of the indoor space; and a controller that controls operation of the air supply fan and the air conditioner, that determines operating conditions of the air conditioner based on the information on the temperature of the outside air acquired by the outdoor temperature sensor and the information on the temperature of the indoor space acquired by the indoor temperature sensor when an instruction to request an increase in an amount of air supply of the air supply fan is generated, and that instructs the air conditioner on the operating conditions determined by the controller, wherein the controller further calculates a predetermined period of time from the instruction to the air conditioner to issuing an instruction to permit the increase in the amount of air supply to the air supply fan, based on an amount of heat of the outside air supplied by the air supply fan during the scheduled operational air flow rate of the air supply fan and on the target temperature in the indoor space set in the air conditioner, and after the predetermined period of time elapses, the controller further issues the instruction to permit the increase in the amount of air supply to the air supply fan.

2. The air conditioning system according to claim 1, wherein the controller determines the amount of heat of the outside air supplied to the indoor space by the air supply fan based on the information on the temperature of the outside air acquired by the outdoor temperature sensor, and determines the operating conditions of the air conditioner based on the amount of heat of the outside air supplied.

3. The air conditioning system according to claim 1, wherein the controller determines the target temperature in the indoor space set in the air conditioner as the operating conditions of the air conditioner.

4. The air conditioning system according to claim 1, wherein the controller determines cooling capacity or heating capacity set for the air conditioner as the operating conditions of the air conditioner.

5. The air conditioning system according to claim 1, further comprising at least one of:
a carbon dioxide concentration detector that detects concentration of carbon dioxide in the indoor space; or
a particulate detector that detects a concentration of particulates in the indoor space,
wherein the at least one of the carbon dioxide concentration detector or the particulate detector transmits an instruction to increase the amount of air supply of the air supply fan.

6. The air conditioning system according to claim 1, wherein the air supply fan maintains the amount of air supply without change from when the instruction to request the increase in the amount of air supply of the air supply fan is generated to when the instruction to permit the increase in the amount of air supply of the air supply fan is received.

7. The air conditioning system according to claim 1, wherein the controller determines the amount of heat of the outside air to be supplied to the indoor space from a capacity of the air conditioner preset in the controller, the scheduled operational air flow rate of the air supply fan acquired from the air supply fan, and the temperature of the outside air, and determines the operating conditions of the air conditioner based on the temperature in the indoor space and the target temperature in the indoor space set in the air conditioner such that the determined amount of heat of the outside air to be supplied to the indoor space is offset to cause the indoor space to have the target temperature.

8. An air conditioning system comprising:
an air supply fan that supplies outside air to an indoor space;
an air conditioner that performs air conditioning of the indoor space;
an outdoor temperature sensor that acquires information on a temperature of the outside air;
an indoor temperature sensor that acquires information on a temperature of the indoor space; and
a controller
that controls operation of the air supply fan and the air conditioner,
that determines operating conditions of the air conditioner based on the information on the temperature of the outside air acquired by the outdoor temperature sensor and the information on the temperature of the indoor space acquired by the indoor temperature sensor when an instruction to request an increase in an amount of air supply of the air supply fan is generated, and
that instructs the air conditioner on the operating conditions determined by the controller,
wherein the controller permits the increase in the amount of air supply of the air supply fan and causes the air supply fan to increase the amount of air supply stepwise to gradually reach an air flow rate after the controller instructs the air conditioner on the operating conditions.

9. The air conditioning system according to claim 8, wherein the controller determines the amount of heat of the outside air to be supplied to the indoor space from a capacity of the air conditioner preset in the controller, a scheduled operational air flow rate of the air supply fan acquired from the air supply fan, and the temperature of the outside air, and determines the operating conditions of the air conditioner based on the temperature in the indoor space and a target temperature in the indoor space set in the air conditioner such that the determined amount of heat of the outside air to be supplied to the indoor space is offset to cause the indoor space to have the target temperature.

10. A controller that
controls operation of an air supply fan that supplies outside air to an indoor space and an air conditioner that performs air conditioning of the indoor space,
determines operating conditions of the air conditioner based on information on temperature of the outside air and information on temperature of the indoor space when an instruction to request an increase in an amount of air supply of the air supply fan is generated, and
instructs the air conditioner on the operating conditions determined by the controller,
wherein the controller further calculates a predetermined period of time from the instruction to the air conditioner to issuing an instruction to permit the increase in the amount of air supply to the air supply fan, based on an amount of heat of the outside air supplied by the air supply fan during a scheduled operational air flow rate of the air supply fan and on a target temperature in the indoor space set in the air conditioner, and after the predetermined period of time elapses, the controller further issues the instruction to permit the increase in the amount of air supply to the air supply fan.

11. The controller according to claim 10, wherein the controller determines the amount of heat of the outside air to be supplied to the indoor space from a capacity of the air conditioner preset in the controller, the scheduled operational air flow rate of the air supply fan acquired from the air supply fan, and the temperature of the outside air, and determines the operating conditions of the air conditioner based on the temperature in the indoor space and the target temperature in the indoor space set in the air conditioner such that the determined amount of heat of the outside air to be supplied to the indoor space is offset to cause the indoor space to have the target temperature.

12. A controller that
controls operation of an air supply fan that supplies outside air to an indoor space and an air conditioner that performs air conditioning of the indoor space,
determines operating conditions of the air conditioner based on information on temperature of the outside air and information on temperature of the indoor space when an instruction to request an increase in an amount of air supply of the air supply fan is generated, and
instructs the air conditioner on the operating conditions determined by the controller, wherein
the controller further permits the increase in the amount of air supply of the air supply fan and causes the air supply fan to increase the amount of air supply stepwise to gradually reach an air flow after the controller instructs the air conditioner on the operating conditions.

13. The controller according to claim 12, wherein the controller determines the amount of heat of the outside air to be supplied to the indoor space from a capacity of the air conditioner preset in the controller, the scheduled operational air flow rate of the air supply fan acquired from the air supply fan, and the temperature of the outside air, and determines the operating conditions of the air conditioner based on the temperature in the indoor space and the target temperature in the indoor space set in the air conditioner such that the determined amount of heat of the outside air to be supplied to the indoor space is offset to cause the indoor space to have the target temperature.

* * * * *